3,183,217
COPOLYMERIZATION OF POLAR WITH NON-
POLAR MONOMERS IN THE PRESENCE OF
A FRIEDEL-CRAFTS AND A FREE RADICAL
INITIATOR
George E. Serniuk, Roselle, and Robert M. Thomas,
Mountainside, N.J., assignors to Esso Research and Engineering Company, a corporation of Delaware
No Drawing. Filed Mar. 1, 1961, Ser. No. 92,457
14 Claims. (Cl. 260—85.5)

This invention relates to the production of useful copolymer or multi-component polymeric products. More particularly, it relates to a process of this nature wherein a first monomer that contains strongly negative groups and that responds to free radical initiation but not Friedel-Crafts type of polymerization is complexed with a Friedel-Crafts halide and then the complexed monomer is copolymerized in the presence of a free radical initiator with a second monomer that responds to Friedel-Crafts but not free radical polymerization, and the polymers thereby produced.

The first monomer that contains strongly negative groups responding to free radical but not Friedel-Crafts polymerization employed can be further characterized as typically polar vinyl monomers containing strongly negative groups which do not promote electron pair release at the double bond, e.g., vinyl halides, vinylidene halides, acrylic esters, methacrylic esters; see "Textbook of Polymer Chemistry," by F. W. Billmeyer, Jr., Interscience Publishers, 1957, pages 263, 264. Especially effective and desirable examples of these types of materials are: acrylonitrile, acrolein, methacrylic acid, and methyl methacrylate and their homologous derivatives.

The second monomers that respond to Friedel-Crafts but not free radical polymerization and that can be used in this invention are those containing groups promoting the release of electrons at the double bonds. These are predominantly non polar olefins or only mildly polar substituted olefins, e.g., isobutylene, $\alpha$-methyl styrene, isopropenyl toluene, and vinyl ethers. Particularly effective examples of these types of materials are: ethylene, propylene, isobutylene, hexene-1, and 2-methyl-1-pentene.

The molar ratio of the first monomer and the second respectively, as discussed above, depend on the reaction temperature and other variables and are in the range of about 0.1–50/1.

The polymerization is preferably carried out in the presence of a diluent. Typical organic diluents or media are: ethyl ether, ethyl acetate, acetone, dimethylformamide, butyrolactone, dimethyl sulfoxide, methylene chloride, methyl chloride, etc.

The Friedel-Crafts halides are those which form a complex with the indicated monomers as, for example, through a coordinate bond. Typical metal halides thus include zinc chloride, aluminum chloride, ferric chloride, and cadmium chloride. Boron trifluoride may also be used. The bromides, iodides and fluorides can also be employed. Other halides are those of the following metals: Cu, In, Ti, Zr, Sn, V, Cr, Mo, W, Mn, Co, Ni, Pd, Pt and Os. The halide is conveniently utilized in an equimolar ratio with complexable first monomer. Excess monomer present then merely acts as a diluent. The halide may be first complexed with the monomer and the other monomer containing the initiator then added, or, if desired, the metal halide may be added directly to the mixture of monomers and initiator.

The free radical initiators employed in this process are those known in the art, e.g., benzoyl peroxide, cumene hydroperoxide, peroxidized butyl ether, azobisisobutyronitrile or gamma radiation. Metal alkyl free radical generators such as boron alkyls and aluminum alkyls, e.g., aluminum triethyl can also be employed. The chemical free radical initiators are utilized in an amount of from 0.001 to 5.0 weight percent based on the polar monomer.

The temperature employed is conveniently in the range of from —78° to 175° C. Pressures are conveniently in the range of from 1 to 200 atmospheres. The reaction times may vary between several minutes to several days depending on the reaction temperature and the type and amount of initiator used.

The products, as stated previously, vary from liquids to solids. The character of these products in turn can be influenced by the incorporation of modifying agents such as formaldehyde, acetone, and acetic acid, during the synthesis.

The work-up of the products is illustrated in the examples.

EXAMPLE 1

*Preparation of copolymers of acrylonitrile and 2-methyl-1-pentene*

A 2-liter, 4-way flask fitted with a mechanical stirrer, reflux condenser, nitrogen seal, thermometer, and a heating mantle and pan was charged with 106 g. (2 moles) of acrylonitrile and 168 g. (2 moles) of 2-methyl-1-pentene containing hydroperoxides. The mixture was stirred and 280 g. (2 moles) of $ZnCl_2$ (98%) were added at room temperature. Heat was applied and the temperature allowed to reach 63° C. After 3 hours of stirring polymer was formed.

The unreacted hydrocarbon monomers were decanted and the polymeric product was contacted with water. Most of the zinc chloride catalyst was separated and removed by the repeated treatment of the polymer with water. The polymer, a light yellow colored, tough mass, was dissolved in acetone and precipitated therefrom by the gradual addition of water. The solution-precipitation was repeated. The polymer was dried for 16 hours at 60° C. under 180 mm. Hg pressure. A very tough and light colored product was obtained in a 51% yield based on acrylonitrile. This product showed the following elemental composition: C, 75.50; H, 9.80; N, 13.39. The product is completely soluble in acetone whereas homopolymer of each monomer is not from which its copolymer character is shown. This product formed fibers and cast films thereof showed excellent properties.

EXAMPLE 2

*Preparation of copolymers of methyl acrylate and 2-methyl-1-pentene*

Equipment as described in Example 1 was charged with 86 g. (1 mole) of methyl acrylate and 168 g. (2 moles) of 2-methyl-1-pentene containing hydroperoxides to which were added 136 g. (1 mole) of zinc chloride. The reaction mixture was stirred for 113 minutes at a temperature of 24 to 74° C. The product could no longer be stirred after the above time of contact. The product was isolated according to the same procedure described under Example 1. The product showed the following elemental composition: C, 62.20; H, 8.70; O, 23.88, and was completely soluble in acetone defining copolymer as described in Example 1.

EXAMPLE 3

*Preparation of copolymers of acrylonitrile and 2-methyl-1-pentene*

Equipment as described in Example 1 was charged with 492 ml. (4 moles) of 2-methyl-1-pentene containing hydroperoxides and 0.207 mole of acrylonitrile-$BF_3$ complex which was prepared by adding gaseous $BF_3$ over the surface of chilled acrylonitrile in a molar ratio. During the course of the reaction 1.5 moles of acrylonitrile were added. A fairly vigorous reaction took place. The reaction mixture comprised a liquid top layer called $L_1$ and a yellow colored polymer-catalyst layer called $L_2$. When $L_2$ was worked up it was found to consist of 25 g. of a semi-resinous polymer. The liquid layer $L_1$ was distilled under atmospheric pressure to yield a dimer of 2-methyl-1-pentene which corresponded to 50% based on the monomer charged. The polymeric product was soluble in acetone showing copolymerization. Two kinds of polymerization are shown here which distinguishes the process of the invention; on layer $L_1$ a typical Friedel-Crafts polymerization of 2-methyl-1-pentene and on $L_2$ the copolymerization of this invention.

EXAMPLE 4

*Copolymerization of 2-methyl-1-pentene and acrylonitrile in the presence of free radical and metal halide catalysts*

A run similar to that of Example 1 was made, in this case to determine the effects of both catalyst components in the copolymerization of 2-methyl-1-pentene and acrylonitrile. The results are tabulated below:

|  | Run | | |
| --- | --- | --- | --- |
|  | 1 | 2 | 3 |
| Acrylonitrile, moles | 0.2 | 0.2 | 0.2 |
| 2-methyl-1-pentene, moles | 0.4 | 0.4 | 0.4 |
| Radical initiator | (¹) | none | (¹) |
| Radical initiator, moles | 0.0017 | none | 0.0004 |
| Zinc chloride, moles | none | 0.2 | 0.2 |
| Reaction time, hrs | 6.3 | 6.1 | 1.1 |
| Reaction temperature, °C | 56 | 54 | 59 |
| Resin yield, percent on acrylonitrile | none | 8.5 | 60 |

¹ Benzoyl peroxide.

These results clearly demonstrate that a monomer such as acrylonitrile, which will not substantially homopolymerize at about 60° C. in the presence of either benzoyl peroxide or zinc chloride, copolymerizes quite readily with 2-methyl-1-pentene when it is complexed and used in the presence of the same benzoyl peroxide at about 60° C. This is even more surprising in view of the fact that the free radical initiator benzoyl peroxide is said to become active at 60° C. or above and these reactions were run at the minimum activity level.

EXAMPLE 5

*Acrylonitrile/methallyl chloride copolymer*

Fused $ZnCl_2$, 136.3 g. (1 mole), was contacted with acrylonitrile, 53 g. (1 mole) to form a complex. To this complex was added methallyl chloride, 90.5 g. (1 mole) containing 0.1 g. of benzoyl peroxide. An exothermic reaction ensued. The reaction mixture became viscous and reddish-brown in color. The exotherm caused the temperature to rise to 75° C. After one hour of stirring the reaction product became more viscous but remained mobile. When the temperature of the reaction mixture dropped to 25° C., acetone was added and the reaction mixture dissolved completely. The acetone solution of the reaction product was added at a slow rate to a large volume of water. The reaction product precipitated and had the consistency of a medium asphalt. The precipitated polymer was isolated from the supernatant liquid and again dissolved in acetone containing a small amount of water. This solution was added to a large volume of water at a slow rate, whereupon the polymer precipitated. The supernatant liquids were decanted off and the polymer placed in a vacuum oven for 16 hours at 60° C. under a pressure of 180–200 mm. Hg pressure.

The polymer weighed 65 g.

This product showed the following analysis: C, 55.80; H, 7.90; O, 5.37; N, 4.94; Cl, 26.10. It was acetone soluble.

EXAMPLE 6

*Acrylonitrile/propylene copolymer*

An Aminco bomb, 300 ml., was charged as follows:

| | |
| --- | --- |
| $ZnCl_2$, fused | 24.24 g. (0.2 mole). |
| Acrylonitrile | 13.2 ml. (0.2 mole). |
| Propylene | 42.0 ml. (liquid) (0.6 mole). |
| Cumene hydroperoxide | 2 drops (0.05 g. of 71% stock solution). |
| Acetone | 14.7 ml. (0.2 mole). |

The bomb was sealed and heated at 100° C. for one hour. The maximum pressure recorded was 295 p.s.i.g. The reaction product was fluid and some gel product was present. The mixture was filtered to recover the soluble portion of the product. Water was added at a slow rate to the clear filtrate and after an equal volume of water was delivered, the polymer precipitated. The supernatant liquids were decanted and the recovered polymer was stripped of residual solvents by heating for 16 hours at 60° C. under 180–200 mm. Hg pressure. The product had a grey-white color and showed a nitrogen content of 14.4%, which corresponds to a combined acrylonitrile content of 54.54%. The product was completely soluble in acetone again indicating copolymerization since the homopolymers of each monomer are not soluble in acetone.

EXAMPLE 7

*Acrylonitrile/isobutylene copolymer*

A 300 ml. Aminco bomb was charged with the following:

| | |
| --- | --- |
| Fused $ZnCl_2$ | 27.24 g. (.2 mole). |
| Acrylonitrile | 13.2 ml. (.2 mole). |
| Isobutylene | 52.0 ml. (.6 mole). |
| Acetone | 14.7 ml. (.2 mole). |
| Cumene hydroperoxide | 2 drops. |

The bomb was sealed and heated for one hour at 100° C. with shaking. There were recovered 9 ml. of a liquid, and a highly viscous residue which was soluble in acetone. A polymer separated on adding water to the acetone soluble product. The polymer was freed of water and solvents by heating for 16 hours at 60° C. under 180–200 mm. Hg pressure.

The product showed the following elemental composition: C, 74.0; H, 10.0; O, 2.91; N, 13.0. The product was completely soluble in acetone again indicating copolymerization since the homopolymers of each monomer are not soluble in acetone.

EXAMPLE 8

*Methacrylonitrile/2-methyl-1-pentene copolymer*

Fused $ZnCl_2$, 136.2 g. (1 mole), was added to 67 g. (1 mole) of freshly distilled methacrylonitrile. When the $ZnCl_2$ was completely complexed, 246 ml. (2 moles) of 2-methyl-1-pentene and 0.5 g. of azobisisobutyronitrile were added. The reaction was conducted in a nitrogen atmosphere. After 1½ hours, polymer formed and began to climb the stirrer shaft. The supernatant layer was decanted and the bottom polymer layer was treated with water, whereupon the polymer separated from the catalyst.

The polymer was separated, dissolved in acetone, treated with animal charcoal, and filtered. The filtrate was added to a large volume of water, whereupon the polymer precipitated out. The polymer was collected and placed in a vacuum oven for 16 hours at 60° C. under a pressure of 180–200 mm. Hg pressure to remove water and residual solvents.

Recovered 44.2 g. of a light colored, resinous polymer which showed a nitrogen content of 16.51% and a combined methacrylonitrile content of 79%.

EXAMPLE 9

Acrolein/2-methyl-1-pentene copolymer

A reactor was charged with 150 ml. of anhydrous ethyl ether (distilled from $LiAlH_4$) and 68 g. of fused $ZnCl_2$. To this were added 28 g. of acrolein. When the acrolein and $ZnCl_2$ were completely complexed, a total of 123 ml. of 2-methyl-1-pentene, containing 0.1 g. benzoyl peroxide, was added. After a very short time an exothermic reaction set in and the reaction mixture was foamy and became dark yellow colored. After 1 hour the reaction subsided and the product was isolated. The reaction product was transferred to a separatory funnel and washed with water to remove the catalyst. The washed product was dried over potassium carbonate, filtered, and the product was heated to insure dryness. The product was a viscous orange colored liquid amounting to 38.3 ml. or 37.6 g. This product showed an oxygen content of 12.83%.

EXAMPLE 10

Acrylic acid/1-hexene copolymer

A 1-liter 4-way flask fitted with a mechanical stirrer, reflux condenser, nitrogen seal, thermometer, and a heating mantle was charged as follows:

| | |
|---|---|
| $ZnCl_2$ (fused, 40 mesh size) | 136.2 g. (1 mole). |
| Ethyl ether (dry) | 100 ml. |
| Acrylic acid (glacial) | 70 ml. (1 mole). |
| 1-hexene | 125 ml. |
| Benzoyl peroxide | 0.05 g. |

The mixture was stirred and heated. Within a short time a vigorous reaction ensued. When the reaction mixture cooled, acetone was added thereto and the mixture was stirred. An acetone soluble and an acetone insoluble fraction was obtained.

The acetone soluble product was precipitated from acetone by adding water. After the polymer precipitated a portion of the supernatant acetone-water layer was evaporated. No residue was obtained. The insoluble portion of the polymer was also treated with water. The precipitated polymers were dried.

Soluble product=53.15 g., tan colored, tough, rubbery polymer

Insoluble product=20.5 g., tan colored, tough, rubbery polymer

The soluble product showed an oxygen content of 25.75%.

EXAMPLE 11

Vinyl acetate/2-methyl-1-pentene copolymer $ZnCl_2$, 13.6 g.; vinyl acetate, 18.5 ml.; 2-methyl-1-pentene, 25 ml.; and 0.05 g. of azobisisobutyronitrile were heated on a steam bath for one hour. The reaction mixture increased in viscosity. A total of 50 ml. of acetone was added to the reaction mixture. The resulting solution was added at a slow rate to boiling water. A viscous, brown colored product separated. The oil product was extracted from the water with ether. The ether was removed by heating on a steam bath. A dark brown, viscous polymer remained which weighed 7.0 g.

Analysis of this product showed an oxygen content of 13.96%.

The products produced according to this invention can be used as chemical intermediates, molding compounds, fibers, surface coatings and cements for glass and metals.

The advantages of this invention will be apparent to those skilled in the art. A novel process for preparing novel products is provided. Increased yields within the desirable temperature ranges are efficiently obtained.

Other salts besides the halides of the metals disclosed can be employed.

It is to be understood that this invention is not limited to the specific examples which have been offered merely as illustrations and that modifications may be made without departing from the spirit of the invention

What is claimed is:

1. A process for copolymerizing a polar vinyl monomer responsive only to free radical polymerization catalysis with a second monomeric monoolefin responsive only to Friedel-Crafts polymerization catalysis which comprises, copolymerizing, under anhydrous conditions a complexed mixture, comprising a polar vinyl monomer selected from the group consisting of vinyl halides, vinylidene halides, vinyl acetate, acrylic acid, acrylic esters, methacrylic acid, methacrylic esters, methacrylonitrile, acrylonitrile and acrolein and up to and including an equimolar amount of a Friedel-Crafts halide per mole of said polar vinyl monomer, with a second monomeric monoolefin selected from the group consisting of isobutylene, α-methyl styrene, isopropenyl toluene, ethylene, propylene, hexene-1, 2-methyl-1-pentene and vinyl ethers in the presence of from about 0.001 to about 5 wt. percent, based on polar vinyl monomer, of a free radical initiator at a temperature of from about —78° C. to about 175° C., the mole ratio of polar vinyl monomer and second monomeric monoolefin to each other being from about 0.1:1 to about 50:1.

2. The process of claim 1 wherein the copolymerization is conducted in an inert organic solvent.

3. The process of claim 1 wherein the Friedel-Crafts halide is zinc chloride.

4. The process of claim 1 wherein the Friedel-Crafts halide is boron trifluoride.

5. The process of claim 1 wherein the free radical initiator is benzoyl peroxide.

6. A process for copolymerizing a polar vinyl monomer responsive only to free radical polymerization catalysis with a second monomeric monoolefin responsive only to Friedel-Crafts polymerization catalysis which comprises, admixing a polar vinyl monomer selected from the group consisting of vinyl halides, vinylidene halides, vinyl acetate, acrylic acid, acrylic esters, methacrylic acid, methacrylic esters, methacrylonitrile, acrylonitrile and acrolein, a second monomeric monoolefin selected from the group consisting of isobutylene, α-methyl styrene, isopropenyl toluene, ethylene, propylene, hexene-1, 2-methyl-1-pentene and vinyl ethers, and up to and including an equimolar amount of a Friedel-Crafts halide per mole of said polar vinyl monomer at ambient temperature and copolymerizing the resultant admixture in the presence of from about 0.001 to about 5 wt. percent, based on polar vinyl monomer of a free radical initiator, under anhydrous conditions, and at a temperature of from about —78° C. to about 175° C., the mole ratio of polar vinyl monomer and second monomeric monoolefin to each other being from about 0.1:1 to about 50:1.

7. The process of claim 6 wherein the copolymerization is conducted in an inert organic solvent.

8. The process of claim 6 wherein the Friedel-Crafts halide is zinc chloride.

9. The process of claim 6 wherein the Friedel-Crafts halide is boron trifluoride.

10. The process of claim 6 wherein the free radical initiator is benzoyl peroxide.

11. A process comprising admixing an equimolar amount respectively of acrylonitrile, 2-methyl-1-pentene and zinc chloride at room temperature and copolymerizing the resultant admixture in the presence of a minor amount of hydroperoxide at a temperature of about 60° C.

12. A process comprising, copolymerizing, under anhydrous conditions, a complexed mixture, comprising an equimolar amount of acrylonitrile and zinc chloride with 2-methyl-1-pentene in the presence of a minor amount of a hydroperoxide at a temperature of about 60° C., the mole ratio of acrylonitrile to 2-methyl-1-pentene being about 1:2.

13. A process comprising, copolymerizing, under anhydrous conditions, a complexed mixture, comprising an equimolar amount of acrylonitrile and zinc chloride, with isobutylene in the presence of a minor amount of cumene hydroperoxide at a temperature of about 100° C., the mole ratio of acrylonitrile to isobutylene being about 1:3.

14. A process comprising admixing methyl acrylate, 2-methyl-1-pentene and zinc chloride at room temperature and copolymerizing the resultant admixture in the presence of a minor amount of a hydroperoxide at a temperature of from about 20° C. to about 80° C., the mole ratio of methyl acrylate, 2-methyl-1-pentene and zinc chloride being about 1:2:1.

References Cited by the Examiner

UNITED STATES PATENTS

| | | | |
|---|---|---|---|
| 2,444,643 | 7/48 | Fryling | 260—83.1 |
| 2,540,950 | 2/51 | Jones | 260—85.5 |
| 2,569,506 | 10/51 | Vandenberg | 260—86.7 |

OTHER REFERENCES

Basdekis: Chem. Abs., vol. 53, page 19266i (1959).

Andreeu et al.: Chem. Abs., vol. 53, page 20900g (1959).

Belonovskaya et al.: Chem. Abs., vol. 54, page 10383d (1960).

JOSEPH L. SCHOFER, *Primary Examiner.*

P. E. MANGAN, J. R. LIBERMAN, LEON J. BERCOVITZ, *Examiners.*